United States Patent
Hayashi et al.

(10) Patent No.: US 11,812,192 B2
(45) Date of Patent: Nov. 7, 2023

(54) RECORDING AND REPRODUCING CONTROL DEVICE, REPRODUCING CONTROL DEVICE, DISPLAY CONTROL METHOD AND NON-TRANSITORY STORAGE MEDIUM

(71) Applicant: JVCKENWOOD Corporation, Yokohama (JP)

(72) Inventors: Keita Hayashi, Yokohama (JP); Yasutoshi Sakai, Yokohama (JP); Hirofumi Taniyama, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/830,373

(22) Filed: Jun. 2, 2022

(65) Prior Publication Data
US 2022/0295010 A1  Sep. 15, 2022

Related U.S. Application Data

(63) Continuation of application No. PCT/JP2020/039786, filed on Oct. 22, 2020.

(30) Foreign Application Priority Data

Jan. 24, 2020  (JP) ................................ 2020-010088

(51) Int. Cl.
*H04N 5/77* (2006.01)
*B60R 1/24* (2022.01)
(Continued)

(52) U.S. Cl.
CPC ................. *H04N 5/77* (2013.01); *B60R 1/24* (2022.01); *B60R 1/26* (2022.01); *H04N 5/2628* (2013.01);
(Continued)

(58) Field of Classification Search
None
See application file for complete search history.

(56) References Cited

U.S. PATENT DOCUMENTS

| 2018/0247471 A1 | 8/2018 | Palmer et al. |
| 2019/0171200 A1* | 6/2019 | Celestin ................ F02P 5/1502 |
| 2020/0114822 A1* | 4/2020 | Choi ........................ B60R 1/00 |

FOREIGN PATENT DOCUMENTS

JP    2019-068436    4/2019

OTHER PUBLICATIONS

International Search Report and Written Opinion for International Application No. PCT/JP2020/039786 dated Dec. 28, 2020, 8 pages.

* cited by examiner

*Primary Examiner* — Eileen M Adams
(74) *Attorney, Agent, or Firm* — AMIN, TUROCY & WATSON, LLP (57) ABSTRACT

A recording and reproducing control device includes a video data acquisition unit configured to acquire video data imaged by an imager for at least one of a front view and a rear view of a vehicle; a detector configured to detect that another vehicle gets close in a distance smaller than a predetermined distance to the vehicle while the vehicle is traveling at a predetermined speed or higher; a point-of-view conversion processor configured to perform a point-of-view conversion process for a bird's-eye view on the acquired video data; a recording controller configured to record the acquired video data; a reproduction controller configured to, when reproducing the video data of a period during which the another vehicle getting close in the predetermined distance or smaller to the vehicle is detected, reproduce the converted video data; and a display controller configured to cause a display to display the reproduced video data.

8 Claims, 7 Drawing Sheets

(51) Int. Cl.
*B60R 1/26* (2022.01)
*H04N 5/262* (2006.01)
*H04N 5/91* (2006.01)
(52) U.S. Cl.
CPC .......... *H04N 5/91* (2013.01); *B60R 2300/105* (2013.01); *B60R 2300/20* (2013.01); *B60R 2300/607* (2013.01)

RECORDING AND REPRODUCING CONTROL DEVICE, REPRODUCING CONTROL DEVICE, DISPLAY CONTROL METHOD AND NON-TRANSITORY STORAGE MEDIUM

CROSS-REFERENCE TO RELATED APPLICATIONS

This application is a Continuation of PCT International Application No. PCT/JP2020/039786 filed on Oct. 22, 2020 which claims the benefit of priority from Japanese Patent Application No. 2020-010088 filed on Jan. 24, 2020, the entire contents of both of which are incorporated herein by reference.

FIELD

The present application relates to a recording and reproducing control device, a reproducing control device, a display control method and a non-transitory storage medium.

BACKGROUND

A Device that records and reproduces a video captured by a camera that is provided in a vehicle as what is called a drive recorder video have been known (see Japanese Laid-open Patent Publication No. 2019-068436).

SUMMARY

Even when a video captured by a normal drive recorder is reproduced in an event in which an own vehicle is involved in road rage by another vehicle around the own vehicle in addition to an event that is detected according to a crash against the own vehicle, or the like, it is difficult to determine a degree of road rage and it may be difficult to verify dangerous driving by the another vehicle.

A recording and reproducing control device, a reproducing control device, a display control method and a non-transitory storage medium are disclosed.

According to one aspect, there is provided a recording and reproducing control device comprising: a video data acquisition unit configured to acquire video data of a video imaged by an imager that captures at least one of a front view and a rear view of a vehicle; a detector configured to detect that another vehicle gets close in a distance smaller than a predetermined distance to the vehicle in a state in which the vehicle is traveling at a predetermined speed or higher; a point-of-view conversion processor configured to perform a point-of-view conversion process in which a virtual point of view is set on an upper side of the vehicle on the video data acquired by the video data acquisition unit; a recording controller configured to record the video data acquired by the video data acquisition unit; a reproduction controller configured to, when reproducing the video data of a period during which the detector detects that the another vehicle gets close in the distance smaller than the predetermined distance to the vehicle in the video data recorded by the recording controller, reproduce the video data obtained by converting the point of view of the video data by the point-of-view conversion processor; and a display controller configured to cause a display to display the video data reproduced by the reproduction controller.

According to one aspect, there is provided a reproducing control device comprising: an information acquisition unit configured to acquire video data of a video imaged by an imager that captures at least one of a front view and a rear view of a vehicle and information presenting a travel speed of the vehicle and a distance between the vehicle and another vehicle; a point-of-view conversion processor configured to perform a point-of-view conversion process in which a virtual point of view is set on an upper side of the vehicle on the video data acquired by the information acquisition unit; and a reproduction controller configured to, when reproducing the video data of a period during which the travel speed of the vehicle is equal to or higher than a predetermined speed and a distance between the vehicle and the another vehicle is a predetermined distance or smaller, reproduce the video data obtained by converting the point of view of the video data by the point-of-view conversion processor.

According to one aspect, there is provided a display control method comprising: a video data acquiring step of acquiring video data of a video imaged by an imager that captures at least one of a front view and a rear view of a vehicle; a detecting step of detecting that another vehicle gets close in a distance smaller than a predetermined distance to the vehicle in a state in which the vehicle is traveling at a predetermined speed or higher; a point-of-view conversion processing step of performing a point-of-view conversion process in which a virtual point of view is set on an upper side of the vehicle on the video data acquired at the video data acquiring step; a recording controlling step of recording the video data acquired at the video data acquiring step; a reproduction controlling step of, when reproducing the video data of a period during which it is detected at the detecting step that the another vehicle gets close in the distance smaller than the predetermined distance to the vehicle in the video data recorded at the recording controlling step, reproducing the video data obtained by converting the point of view of the video data at the point-of-view conversion processing step; and a display controlling step of causing a display to display the video data reproduced at the reproduction controlling step.

According to one aspect, there is provided a non-transitory storage medium that stores a program that causes a computer that runs as a recording and reproducing control device to execute: a video data acquiring step of acquiring video data of a video imaged by an imager that captures at least one of a front view and a rear view of a vehicle; a detecting step of detecting that another vehicle gets close in a distance smaller than a predetermined distance to the vehicle in a state in which the vehicle is traveling at a predetermined speed or higher; a point-of-view conversion processing step of performing a point-of-view conversion process in which a virtual point of view is set on an upper side of the vehicle on the video data acquired at the video data acquiring step; a recording controlling step of recording the video data acquired at the video data acquiring step; a reproduction controlling step of, when reproducing the video data of a period during which it is detected at the detecting step that the another vehicle gets close in the distance smaller than the predetermined distance to the vehicle in the video data recorded at the recording controlling step, reproducing the video data obtained by converting the point of view of the video data at the point-of-view conversion processing step; and a display controlling step of causing a display to display the video data reproduced at the reproduction controlling step.

The above and other objects, features, advantages and technical and industrial significance of this application will be better understood by reading the following detailed

DETAILED DESCRIPTION OF THE PREFERRED EMBODIMENTS

With reference to the accompanying drawings, embodiments of a recording and reproducing control device, a reproduction control device, a display control method and a non-transitory storage medium will be described in detail below. The embodiments below do not limit the application.

First Embodiment

Figure 1:
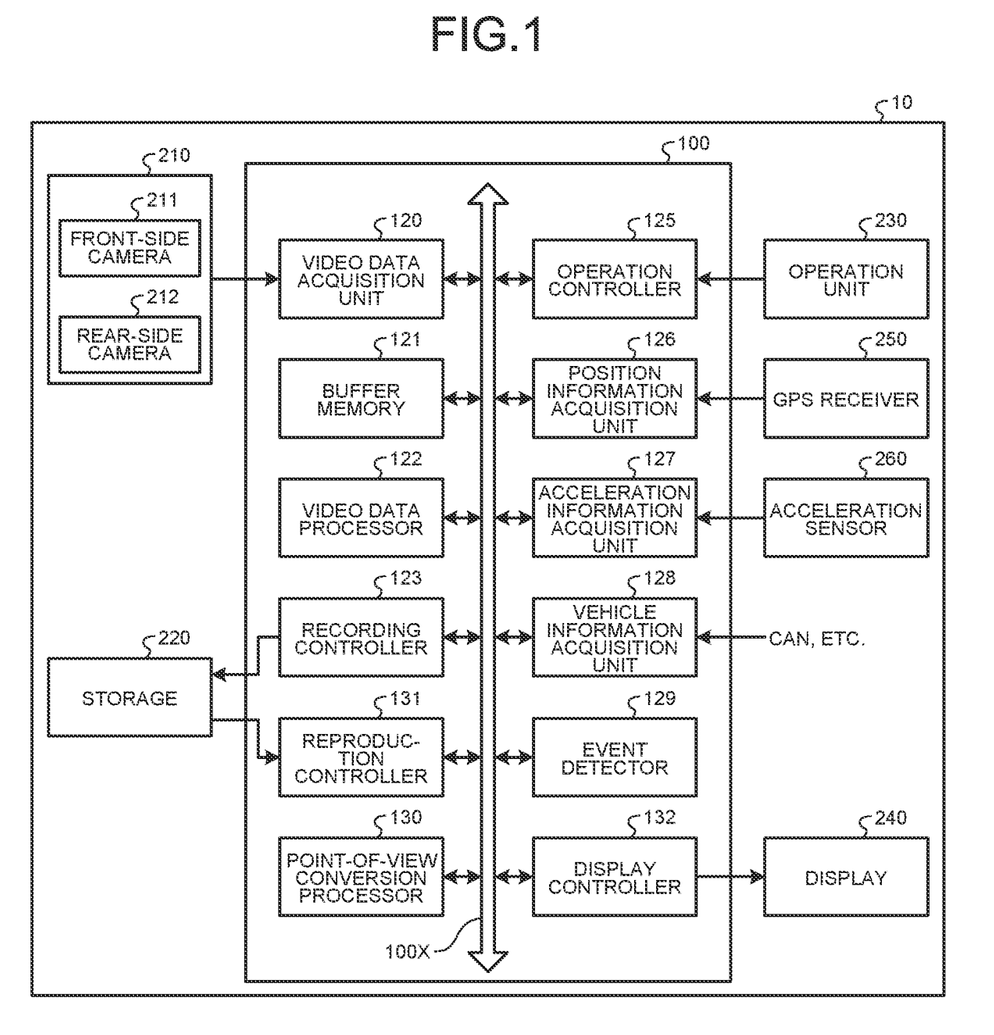
FIG. 1 is a block diagram illustrating an example of a configuration of a vehicle recording and reproducing device including a recording and reproducing control device according to a first embodiment.

FIG. 1 is a block diagram illustrating an example of a configuration of a vehicle recording and reproducing device 10 including a recording and reproducing control device 100 according to a first embodiment. When reproducing video data of a period during which another vehicle gets close in a distance smaller than a predetermined distance to a vehicle, the vehicle recording and reproducing device 10 reproduces a video (bird's-eye-view video) 310 obtained by converting a point of view of the video data by a point-of-view conversion processor 130.

The vehicle recording and reproducing device 10 is a so-called drive recorder and may include, in addition to a drive recorder mounted on a vehicle, a drive recorder that is portable and usable in a vehicle. The vehicle recording and reproducing device 10 includes a camera unit (an imager) 210, a storage 220, an operation unit 230, a display 240, a GPS (Global Positioning System) receiver 250, an acceleration sensor 260, and the recording and reproducing control device 100.

The camera unit 210 is a camera that images an outside view of a vehicle. The camera unit 210 images at least one of a front view and a rear view of the vehicle. The camera unit 210 may be a bird's-eye-view camera unit including a front-side camera 211 that images the front view of the vehicle, a rear-side camera 212 that images the rear view of the vehicle and a left-side camera and a right-side camera that are not illustrated in the drawings. The camera unit 210 includes at least the front-side camera 211 that images the front view of the vehicle and the rear-side camera 212 that images the rear view of the vehicle. In the present embodiment, the camera unit 210 includes the front-side camera 211 that images the front view and the rear-side camera 212 that images the rear view. The front-side camera 211 is arranged, for example, at the front of the vehicle. The rear-side camera 212 is arranged, for example, at the rear of the vehicle. When not required to be distinguished, the front-side camera 211 and the rear-side camera 212 are described as the camera unit 210. The camera unit 210 keeps imaging a video from when an engine starts until the engine stops, that is, while the vehicle is running. In the present embodiment, the camera unit 210 keeps imaging a video while an accessory power of the vehicle is ON. The camera unit 210 outputs data of the imaged video to a video data acquisition unit 120 of the recording and reproducing control device 100. The video data is, for example, moving images consisting of images of 30 frames per second.

The storage 220 is used to temporarily record data in the vehicle recording and reproducing device 10. The storage 220 is, for example, a semiconductor memory device, such as a RAM (Random Access Memory) or a flash memory, or a recording unit, such as a memory card. Alternatively, it may be an external recording unit that is wirelessly connected via a communication device not illustrated in the drawings. The storage 220 records event recording data or loop recording data according to a control signal that is output from a recording controller 123 of the recording and reproducing control device 100.

The operation unit 230 is able to receive various operations on the vehicle recording and reproducing device 10. For example, the operation unit 230 is able to receive an operation of manually saving data of the imaged video in the storage 220. For example, the operation unit 230 is able to receive an operation of reproducing the event recording data or the loop recording data that is recorded in the storage 220. For example, the operation unit 230 is able to receive an operation of deleting the event recording data that is recorded in the storage 220. For example, the operation unit 230 is able to receive an operation of ending the loop recording. The operation unit 230 outputs operation information to an operation controller 125 of the recording and reproducing control device 100.

The operation unit 230 is a touch panel provided in the display 240 and, for an operation of reproducing the event recording data that is recorded in the storage 220, an instruction to choose and reproduce the event recording data is made by touching a list of the event recording data, or the like, that is displayed on the display 240.

The display 240 is, for example, a display device unique to the vehicle recording and reproducing device 10 or a display device that is shared with other systems including a navigation system. The display 240 is, for example, a display including a liquid crystal display (LCD), an organic electro-luminescence (EL) display, or the like. The display 240 displays a video based on a video signal that is output from display controller 132 of the recording and reproducing control device 100. The display 240 displays a video that the camera unit 210 is imaging or a video that is recorded in the storage 220.

The GPS receiver 250 receives radio waves from a GPS satellite not illustrated in the drawings. The GPS receiver 250 outputs a signal of the received radio waves to a position information acquisition unit 126 of the recording and reproducing control device 100.

The acceleration sensor 260 is a sensor that detects an acceleration applied to the vehicle. The acceleration sensor 260 outputs a result of detection to an acceleration information acquisition unit 127 of the recording and reproducing control device 100. The acceleration sensor 260 is, for example, a sensor that detects an acceleration in three-axis directions. The three-axis directions includes a front-rear direction, a left-right direction and an up-down direction of the vehicle. Using the acceleration in the three-axis directions, it is possible to detect a shock on the vehicle.

The recording and reproducing control device 100 is, for example, an arithmetic processing device (control device) consisting of a CPU (Central Processing Unit), etc. The recording and reproducing control device 100 loads a program that is recorded in a memory and executes commands contained in the program. The recording and reproducing control device 100 includes an internal memory not illustrated in the drawings and the internal memory is used for a temporal storage of data in the recording and reproducing control device 100, etc. The recording and reproducing control device 100 includes the video data acquisition unit 120, a buffer memory 121, a video data processor 122, the recording controller 123, the operation controller 125, the position information acquisition unit 126, the acceleration information acquisition unit 127, a vehicle information acquisition unit 128, an event detector (detector) 129, the point-of-view conversion processor 130, a reproduction controller 131, and the display controller 132 that are connected to a bus 100X.

The video data acquisition unit 120 acquires the video data obtained by imaging at least one of the front view and the rear view of the vehicle. More specifically, the video data acquisition unit 120 acquires the video data that is output by the camera unit 210.

The buffer memory 121 is an internal memory that is provided in the recording and reproducing control device 100 and that temporarily records the video data for a certain time that is acquired by the video data acquisition unit 120 while updating the video data.

The video data processor 122 converts the video data temporarily recorded in the buffer memory 121 into a given file format, such as an MP4 format, that is coded by a given codec method, such as H.264 or MPEG-4 (Moving Picture Experts Group). The video data processor 122 generates video data as a file for a certain period from the video data temporarily recorded in the buffer memory 121. Specifically, using the video data temporarily recorded in the buffer memory 121, the video data processor 122 generates video data of 60 seconds as one file in a recording. The video data processor 122 outputs the generated video data to the recording controller 123. The video data processor 122 outputs the generated video data to the display controller 132. The period of the video data that is generated as the file is set at 60 seconds as an example. However, the period is not limited thereto. The video data herein may be data containing sound in addition to the video imaged by the camera unit 210.

The recording controller 123 performs a control to cause the video data that is generated as a file by the video data processor 122 to be recorded in the storage 220. During a period in which a loop recording process is executed, such as a period in which the accessory power is ON, the recording controller 123 records the video data that is generated as a file by the video data processor 122 in the storage 220 as rewritable video data. More specifically, during the period in which the loop recording process is executed, the recording controller 123 keeps recording video data that is generate by the video data processor 122 in the storage 220 and, when a capacity of the storage 220 is full, overwrites the oldest video data with new video data and records the new video data.

When the event detector 129 detects an event, the recording controller 123 stores, in the storage 220, the video data f a predetermined period from the video data generated by the video data processor 122 as event recording data that is prohibited from being rewritten.

Furthermore, when the event detected by the event detector 129 is road rage by another vehicle, the recording controller 123 stores event recording data to which road rage information indicating that road rage is detected is added.

The road rage information is, for example, a closeness flag. For the road rage information, for example, a folder name or a file name may be a folder name or a file name different from a usual one. The road rage information may be associated with the event recording data or may be associated with a time point at which the road rage is detected in the event recording data.

The event recording data is, during a period in which the loop recording process is performed, video data of a predetermined period before and after the time point at which the event is detected. The event recording data is, when the loop recording process is not performed and imaging starts after an event is detected, video data from the start of imaging after detecting the event until a predetermined period elapses. The predetermined period is, for example, a period approximately between 10 seconds and 60 seconds before and after the time point at which the event is detected.

The operation controller 125 acquires operation information on an operation that is received by the operation unit 230. For example, the operation controller 125 acquires saving operation information indicating an operation of manually saving the video data, choosing operation information indicating an operation of choosing the video data, reproducing operation information indicating an operation of reproducing the video data, or deleting operation information indicating an operation of deleting the video data, and outputs a control signal. For example, the operation controller 125 acquires end operation information indicating an operation of ending the loop recording and outputs a control signal.

The position information acquisition unit 126 calculates information on a current position of the vehicle by a known method based on the radio waves received by the GPS receiver 250. When the event detector 129 detects an event, the positional information calculated by the position information acquisition unit 126 is recorded together with the event recording data.

The acceleration information acquisition unit 127 acquires acceleration information indicating an acceleration applied to the vehicle from a result of detection by the acceleration sensor 260.

The vehicle information acquisition unit 128 acquires vehicle information, such as information of a speed of the vehicle, from a CAN (Controller Area Network) and various sensors that sense a state of the vehicle. The vehicle information acquisition unit 128 outputs the acquired vehicle information to the event detector 129.

The event detector 129 detects an event on the vehicle. A method by which the event detector 129 detects an event on the vehicle may be any method and, for example, the event detector 129 detects an event based on the result of detection by the acceleration sensor 260. In this case, when an acceleration equal to or higher than a threshold is detected by the acceleration sensor 260, the event detector 129 detects the acceleration as an event. As the threshold of the acceleration detected as the event by the event detector 129, a threshold at which a shock on the vehicle is detected is set.

The event detector 129 detects road rage by another vehicle as an event. More specifically, the event detector 129 detects that, as an event of road rage by another vehicle, another vehicle gets close in a distance smaller than a predetermined distance to the own vehicle while traveling at a predetermined speed or higher. In the present embodiment, when the event detector 129 detects that the another vehicle gets close in a distance smaller than the predetermined distance to the own vehicle while traveling at the predetermined speed or higher based on the vehicle information acquired by the vehicle information acquisition unit 128 and the data of the video imaged by the camera unit 210, the event detector 129 detects that the another vehicle gets road rage. A state of getting close by another vehicle in the distance smaller than the predetermined distance is recognized by performing an image recognition process on the video data. Based on an area of the recognized another vehicle occupying in the video data, it is possible to determine whether another vehicle gets close in the distance smaller than the predetermined distance.

The point-of-view conversion processor 130 performs, on the video data that is acquired by the video data acquisition unit 120, a point-of-view conversion process in which a virtual point of view E is set on an upper side of the vehicle to convert the video data into video data from the virtual point of view E. The point-of-view conversion processor 130 may perform the point-of-view conversion process in which the virtual point of view E is set on the upper side between an end of the own vehicle and an end of the opposing another vehicle. The point-of-view conversion processor 130 generates a bird's-eye-view video 310 displaying a predetermined display area from the vehicle. The point-of-view conversion processor 130 outputs the generated bird's-eye-view video 310 to the display controller 132.

The reproduction controller 131 reproduces the event recording data or loop recording data that is chosen. According to control signals on a choosing operation and a reproducing operation that are output from the operation controller 125, the reproduction controller 131 performs control to reproduce the event recording data or the loop recording data recorded in the storage 220.

When reproducing the video data of a period during which the event detector 129 detects that another vehicle gets close in a distance smaller than the predetermined distance to the vehicle from the video data that is recorded by the recording controller 123, the reproduction controller 131 reproduces the bird's-eye-view video 310 obtained by converting the point of view of the video data by the point-of-view conversion processor 130. When there is road rage information that is associated with the chosen event recording data, the reproduction controller 131 outputs the bird's-eye-view video 310 to the display controller 132. The reproduction controller 131 may reproduce the bird's-eye-view video 310 together with a reproduction video 300 that is the event recording data or the loop recording data or reproduce only the bird's-eye-view video 310.

The reproduction controller 131 may reproduce the bird's-eye-view video 310 obtained by converting the point of view of the video data in a direction in which it is detected that the another vehicle gets close in a distance smaller than the predetermined distance to the own vehicle. More specifically, when the another vehicle on the rear side gets close in a distance smaller than the predetermined distance, the reproduction controller 131 may reproduce the bird's-eye-view video 310 obtained by converting the point of view of the video data obtained by imaging at least the rear view. The direction in which the another vehicle that gets close to the own vehicle is detected can be acquired from the video data in which the event detector 129 detects road rage by the another vehicle. When road rage by the another vehicle is detected from the video data obtained by imaging the rear view, the direction in which the another vehicle that gets close to the own vehicle is detected is the rear side.

The reproduction controller 131 may reproduce the bird's-eye-view video 310 containing a scale that makes it possible to determine a distance between the end of the own vehicle and the end of the opposing another vehicle.

The display controller 132 controls display of the video data on the display 240. The display controller 132 outputs a video signal according to which the display 240 is caused to output the video data. More specifically, the display controller 132 causes the display 240 to display the video that is reproduced by the reproduction controller 131. The display controller 132 outputs a video signal of the video imaged by the camera unit 210 or a video signal that is displayed by reproducing the event recording data or the loop recording data recorded in the storage 220.

The display controller 132 controls display of the event recording data or the loop recording data recorded in the storage 220 on the display 240. When the video data to be reproduced includes the road rage information, the display controller 132 may cause the bird's-eye-view video 310 (see FIG. 3) to be displayed together with the reproduction video 300 that is the event recording data or the loop recording data or may cause only the bird's-eye-view video 310 (see FIG. 3) to be displayed.

Using FIGS. 2 to 7, the video displayed on the display 240 by the display controller 132 will be described.

Figure 2:
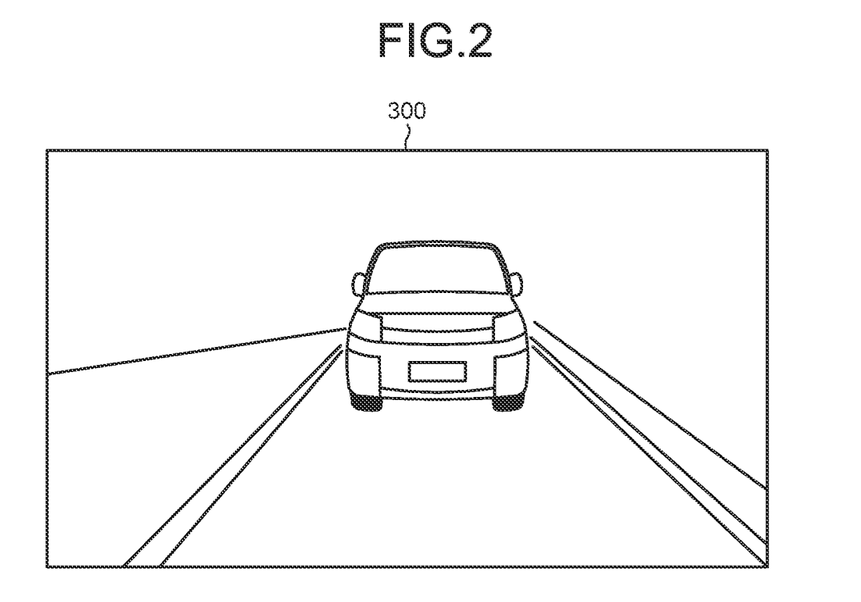
FIG. 2 is a diagram illustrating an example of a video that is displayed on a display.

FIG. 2 is a diagram illustrating an example of the video that is displayed on the display 240. As illustrated in FIG. 2, the display controller 132 causes the display 240 to solely display the reproduction video 300 that is the loop recording data in a state in which an event or closeness of another vehicle is not detected.

Figure 3:
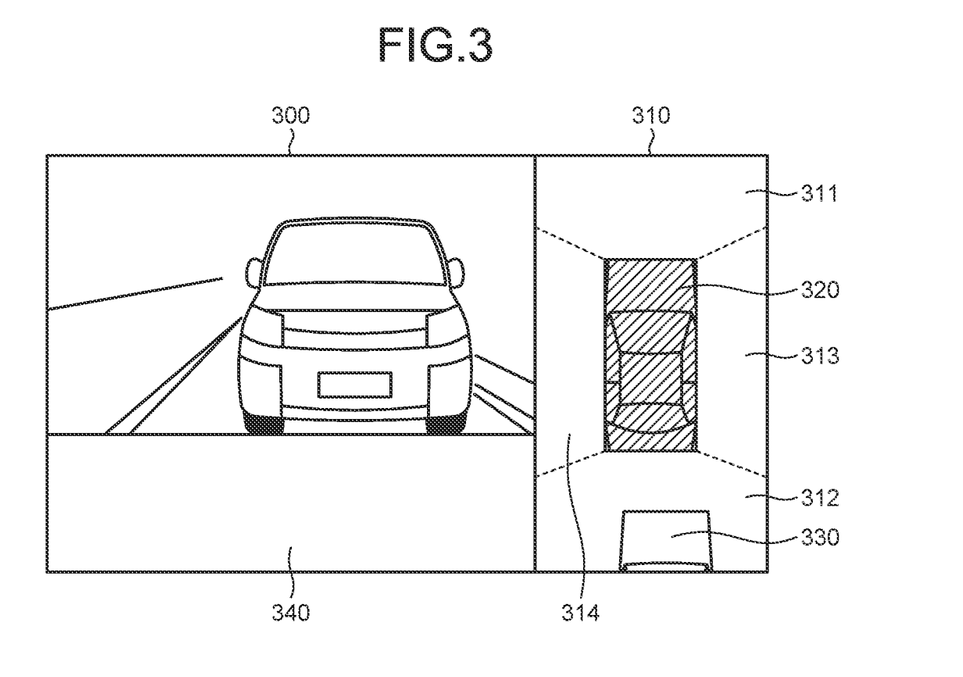
FIG. 3 is a diagram illustrating another example of the video that is displayed on the display.

FIG. 3 is a diagram illustrating another example of the video that is displayed on the display 240. As illustrated in FIG. 3, when the reproduction video 300 includes the corresponding road rage information, the display controller 132 causes the display 240 to display, together with the reproduction video 300, the bird's-eye-view video 310 obtained by converting the point of view of the reproduction video 300. The reproduction video 300 is a video in a case in which the area of another vehicle occupying in the video data is large and is a video of road rage by the another vehicle. An area of display of the reproduction video 300 is reduced in FIG. 3 compared to the case in which the reproduction video 300 is displayed solely on the display 240 as in FIG. 2. The bird's-eye-view video 310 displays an area of approximately 2 m from the own vehicle.

The bird's-eye-view video 310 illustrated in FIG. 3 contains a vehicle icon 320 that is positioned at a center surrounded by a front-side video 311, a rear-side video 312, a right-side video 313 and a left-side video 314. Parts exceeding the area of imaging by the camera unit 210 need not be contained in the bird's-eye-view video 310. The bird's-eye-view video 310 may consist of the rear-side video 312 and the front-side video 311. In this case, the area corresponding to the right-side video 313 and the left-side video 314 may be a black image. Furthermore, the bird's-eye-view video 310 may consist of the rear-side video 312. In this case, the area corresponding to the front-side video 311, the right-side video 313 and the left-side video 314 may be a black image. In other words, the minimum video to be displayed is a video in a direction in which the vehicle that gets road rage is imaged and the video data obtained by imaging the vehicle that gets road rage is displayed as the reproduction video 300 and is displayed also as the bird's-eye-view video 310 obtained by converting the point of view thereof. The rear-side video 312 illustrated in FIGS. 3 to 7 is obtained by performing the point-of-view conversion process on the video that is imaged by the rear-side camera 212 that is provided at the rear of the vehicle and therefore, practically, another vehicle 330 is not presented as in the drawing. The another vehicle 330 illustrated herein schematically represents a position of the another vehicle 330.

The vehicle icon 320 represents a position and an orientation of the vehicle. The vehicle icon 320 is arranged at the center with its front-rear orientation being parallel to the front-rear orientation of the bird's-eye-view video 310. FIG. 3 includes an information display area 340 in which character information is displayed under the reproduction video 300. In the information display area 340, for example, the fact that road rage by the another vehicle is being detected may be displayed by character information.

Figure 4:
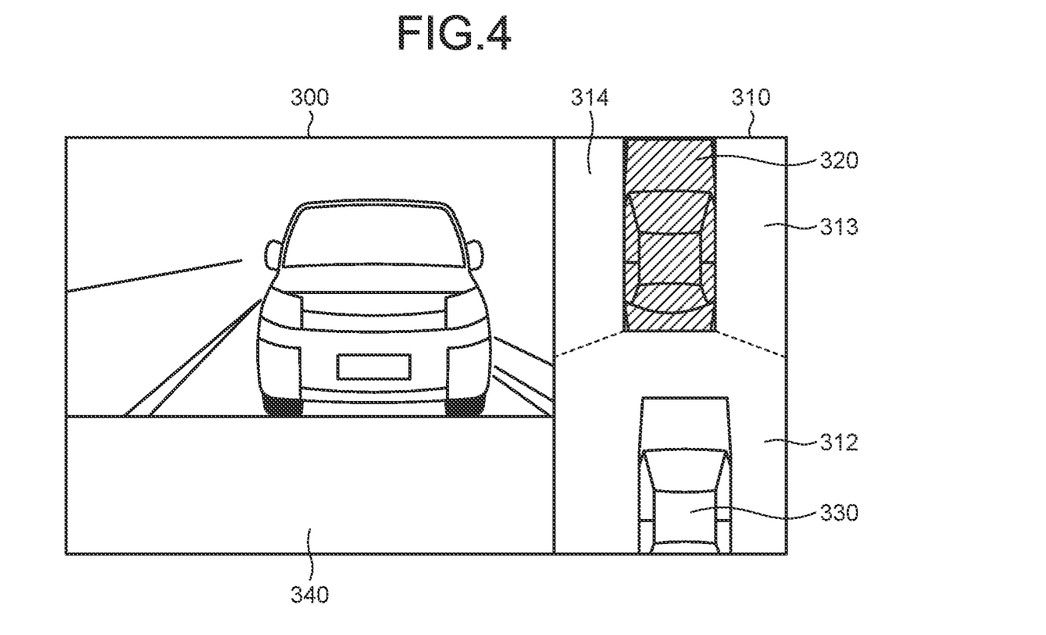
FIG. 4 is a diagram illustrating still another example of the video that is displayed on the display.

FIG. 4 is a diagram illustrating still another example of the video that is displayed on the display 240. As illustrated in FIG. 4, when the reproduction video 300 includes the corresponding road rage information, the display controller 132 causes the display 240 to display the bird's-eye-view video 310 together with the reproduction video 300. The bird's-eye-view video 310 contains the rear-side video 312, the right-side video 313, the left-side video 314 and the vehicle icon 320. The bird's-eye-view video 310 contains the rear view on which the road raging vehicle on the rear side is positioned and does not contain the front view.

Figure 5:
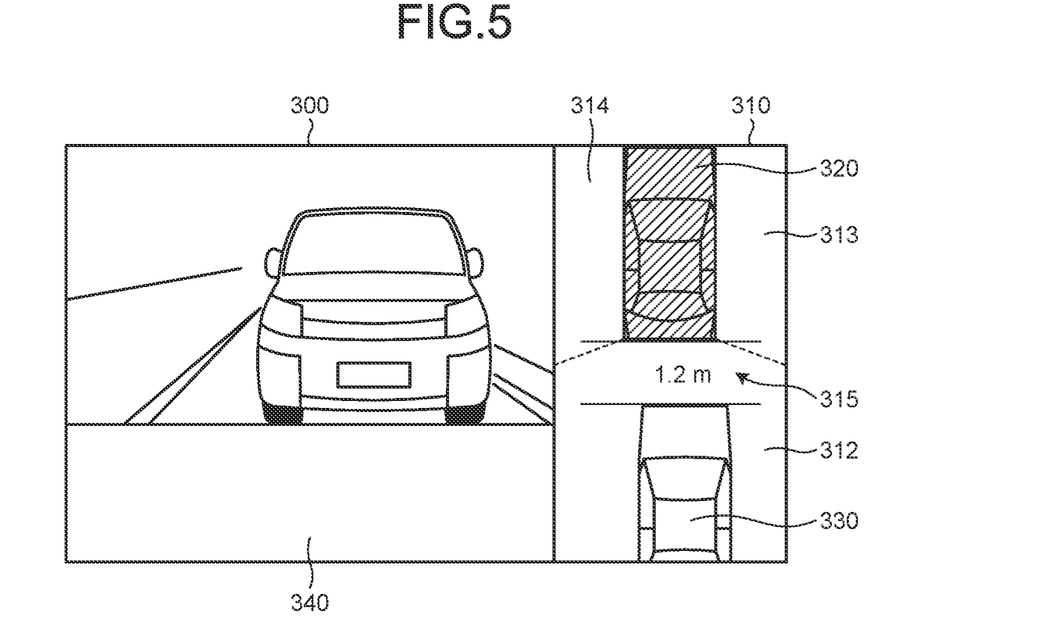
FIG. 5 is a diagram illustrating still another example of the video that is displayed on the display.

FIG. 5 is a diagram illustrating still another example of the video that is displayed on the display 240. As illustrated in FIG. 5, when the reproduction video 300 includes the corresponding road rage information, the display controller 132 causes the display 240 to display the bird's-eye-view video 310 together with the reproduction video 300. The bird's-eye-view video 310 may display distance information 315 presenting a distance between a rear end of the own vehicle and a front end of the another vehicle.

Figure 6:
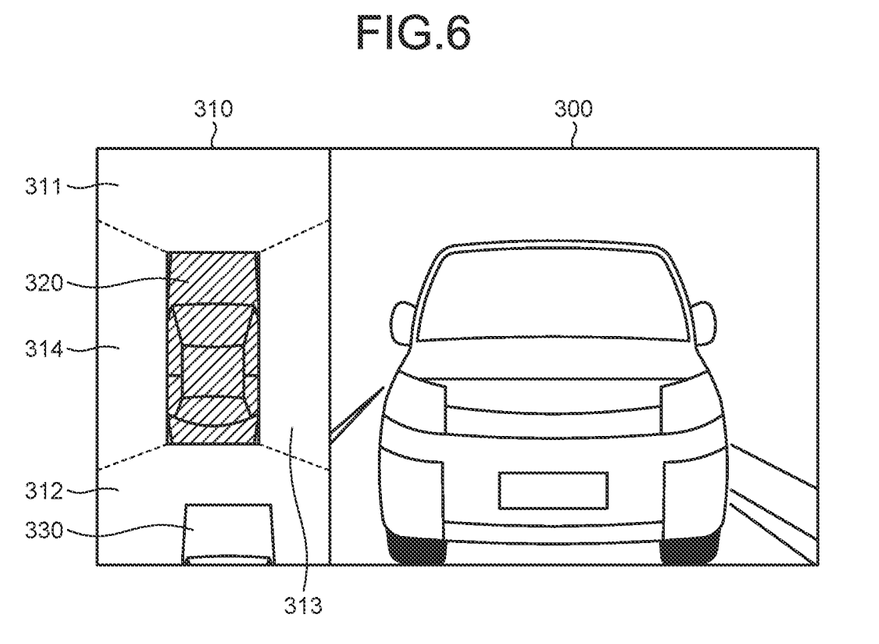
FIG. 6 is a diagram illustrating still another example of the video that is displayed on the display.

FIG. 6 is a diagram illustrating still another example of the video that is displayed on the display 240. As illustrated in FIG. 6, the area of display of the reproduction video 300 corresponds the area of display of the reproduction video 300 in the case in which the reproduction video 300 is displayed solely and not reduced, and the bird's-eye-view video 310 is displayed on the reproduction video 300 in a superimposed manner.

Figure 7:
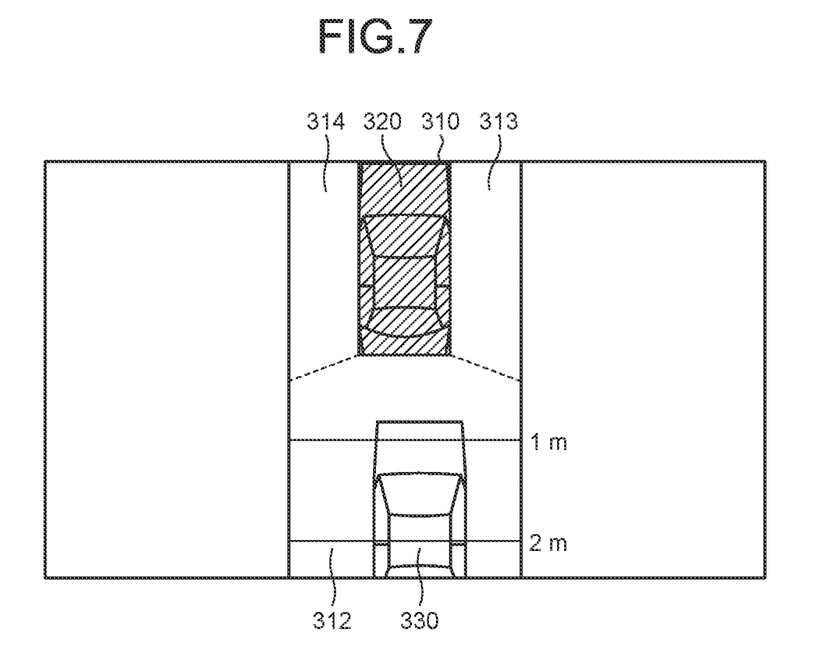
FIG. 7 is a diagram illustrating still another example of the video that is displayed on the display.

FIG. 7 is a diagram illustrating still another example of the video that is displayed on the display 240. As illustrated in FIG. 7, the bird's-eye-view video 310 is displayed solely on the display 240. A scale indicating a distance from the rear end of the vehicle may be displayed on the bird's-eye-view video 310 in a superimposed manner.

Figure 8:
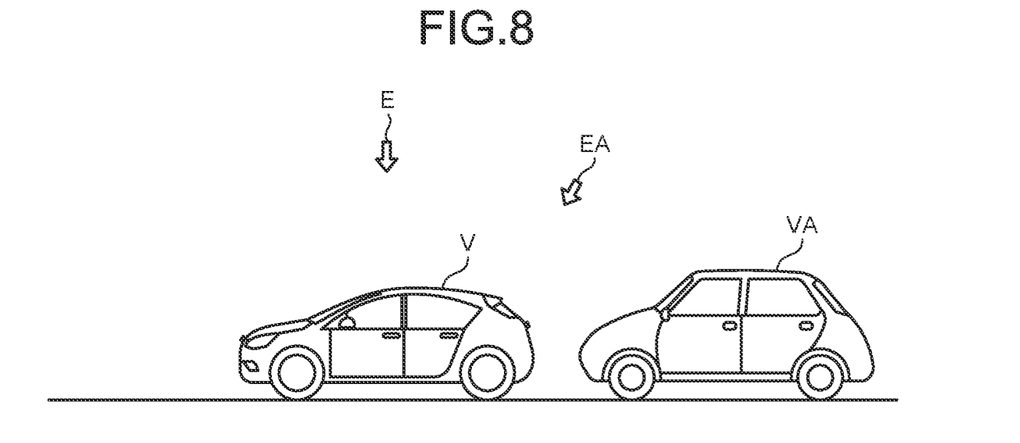
FIG. 8 is a schematic view illustrating an example of a position of a virtual point of view.

Based on the video data that is imaged by the camera unit 210, the point-of-view conversion processor 130 generates the bird's-eye-view video 310 obtained by performing the point-of-view conversion process in which a virtual point of view E is set on an upper side of an own vehicle V. The point-of-view conversion processor 130 may generate the bird's-eye-view video 310 obtained by performing the point-of-view conversion process in which a virtual point of view EA is set on the upper side between the rear end of the vehicle V and the front end of opposing another vehicle VA. In the present embodiment, the point-of-view conversion processor 130 may generate the bird's-eye-view video 310 obtained by performing the point-of-view conversion process in which the virtual point of view EA is set on a rear side of the own vehicle V. A method of the point-of-view conversion process may be any known method and is not limited. The point-of-view conversion processor 130 then performs a synthesizing process of synthesizing the video data on which the point-of-view conversion process is performed. The point-of-view conversion processor 130 then generates the bird's-eye-view video 310 obtained by displaying the vehicle icon 320 on the synthesized video.

Using FIG. 8, the virtual point of view E will be described. The virtual point of view E is set on the upper side with respect to the center of the own vehicle V. The virtual point of view E is a point of view from which the own vehicle V is looked down from above straightly. The center of the own vehicle V is a center in a width direction and a center in a front-rear direction of the own vehicle. Straightly above the own vehicle refers to a position on a vertical line on a reference plane of the own vehicle V. The reference plane is a flat plane that is parallel to a road surface when the own vehicle V is horizontal and is positioned on the road surface. In the present embodiment, the virtual point of view EA is in a position closer to the another vehicle VA than the virtual point of view E. The virtual point of view EA is a point of view from which the own vehicle V is looped down from the rear side.

Figure 9:
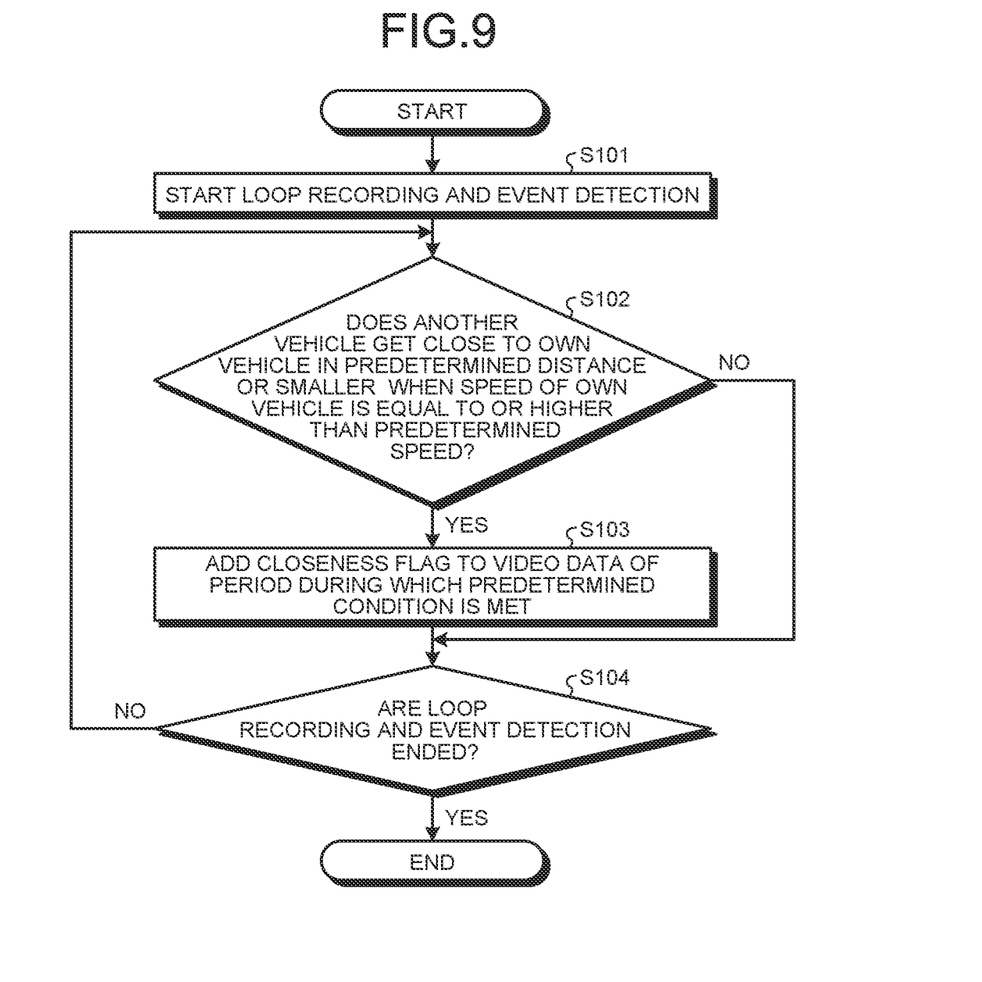
FIG. 9 is a flowchart illustrating a flow of a recording process in the recording and reproducing control device according to the first embodiment.

Using FIG. 9, a flow of a recording process in the recording and reproducing control device 100 will be described next. FIG. 9 is a flowchart illustrating a flow of a recording process in the recording and reproducing control device 100 according to the first embodiment. The case where the loop recording process is performed will be described here. In the description below, an example of the road rage information will be described as a closeness flag.

The recording and reproducing control device 100 starts a loop recording and an event detection (step S101). More specifically, by the event detector 129, the recording and reproducing control device 100 detects an event based on a result of detection by the acceleration sensor 260. By the video data processor 122, the recording and reproducing control device 100 generates loop recording video data of video of a predetermined period from the video data that is recorded in the buffer memory 121. By the recording controller 123, the recording and reproducing control device 100 causes the storage 220 to record the loop recording video data. The recording and reproducing control device 100 proceeds to step S102.

By the event detector 129, the recording and reproducing control device 100 determines whether road rage by another vehicle is detected as an event (step S102). More specifically, the event detector 129 detects road rage by another vehicle as an event when a speed of the own vehicle is equal to or higher than a predetermined speed and the another vehicle gets close to the own vehicle in a predetermined distance or smaller, in other words, when a condition is met. When road rage is detected as an event (YES at step S102), the recording and reproducing control device 100 proceeds to step S103. The event detector 129 does not detect road rage by the another vehicle as an event when the speed of the vehicle is smaller than the predetermined speed or the another vehicle does not get close in a distance smaller than the predetermined distance to the own vehicle, in other words, when the condition is not met. When road rage by the another vehicle is not detected as an event (NO at step S102), the recording and reproducing control device 100 proceeds to step S104.

When road rage by the another vehicle is detected as an event (YES at step S102), by the recording controller 123, the recording and reproducing control device 100 adds a closeness flag to the video data of the period during which road rage by the another vehicle is detected as an event and stores the video data (step S103). More specifically, by the video data processor 122, the recording and reproducing control device 100 adds a closeness flag to the video data containing the period during which the condition is met and generates the video data as event recording data. By the recording controller 123, the recording and reproducing control device 100 stores the event recording data to which the closeness flag is added in the storage 220. The recording and reproducing control device 100 proceeds to step S104.

The recording and reproducing control device 100 determines whether the event detection and the loop recording should be ended (step S104). More specifically, by the operation controller 125, the recording and reproducing control device 100 determines that the event detection and the loop recording should be ended on a predetermined condition, such as a condition in which end operation information is output or in which the operation of the own vehicle ends (YES at step S104), and ends the process. When the end operation information is not output, by the operation controller 125, the recording and reproducing control device 100 determines that the end event detection and the loop recording should not be ended (NO at step S104) and executes the process at step S102 again.

Figure 10:
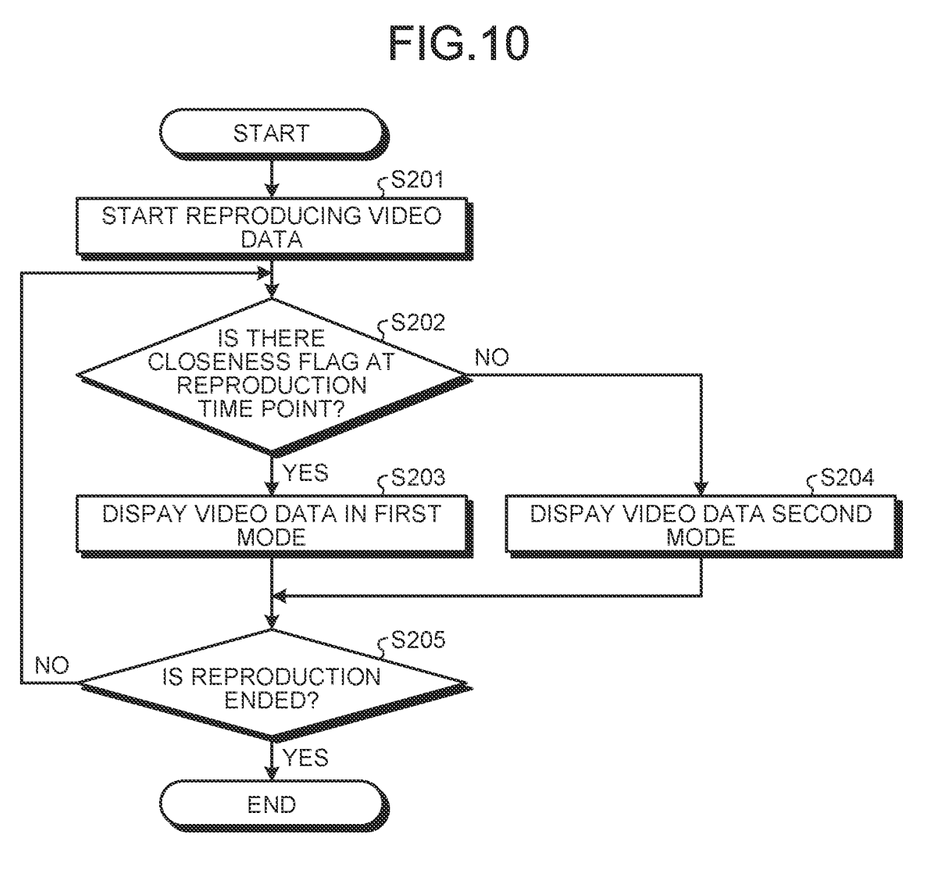
FIG. 10 is a flowchart illustrating a flow of a reproduction process in the recording and reproducing control device according to the first embodiment.

Using FIG. 10, a flow of a reproduction process in the recording and reproducing control device 100 will be described next. FIG. 10 is a flowchart illustrating the flow of the reproduction process in the recording and reproducing control device 100 according to the first embodiment.

When the operation controller 125 acquires operation information indicating an instruction to display event recording data or loop recording data in a reproduction menu, by the reproduction controller 131, the recording and reproducing control device 100 starts reproducing video data to be reproduced (step S201). The recording and reproducing control device 100 proceeds to step S202.

The recording and reproducing control device 100 determines whether there is a closeness flag at a reproduction time point the video data to be reproduced (step S202). More specifically, when there is a closeness flag at the reproduction time point of the video data to be reproduced, which is recorded in the storage 220, the recording and reproducing control device 100 determines that there is a closeness flag at the reproduction time point of the video data to be reproduced (YES at step S202) and proceeds to step S203. When there is no closeness flag at the reproduction time point of the video data to be reproduced, which is recorded in the storage 220, the recording and reproducing control device 100 determines that there is no closeness flag at the reproduction time point of the video data to be reproduced (NO at step S202) and proceeds to step S204.

When it is determined that there is a closeness flag at the reproduction time point of the video data to be reproduced (YES at step S202), the recording and reproducing control device 100 displays the video data on the display 240 in a first mode (step S203). The first mode is, for example, the display mode illustrated in FIGS. 3 to 7. The recording and reproducing control device 100 proceeds to step S205.

When it is determined that there is no closeness flag at the reproduction time point of the video data to be reproduced (NO at step S202), the recording and reproducing control device 100 displays the video data on the display 240 in a second mode (step S204). The second mode is, for example, the display mode illustrated in FIG. 2. The recording and reproducing control device 100 proceeds to step S205.

The recording and reproducing control device 100 determines whether the reproduction of the video data to be reproduced (step S205) should be ended. When the video data to be reproduced is reproduced to the end or when an operation of stopping the reproduction is performed, the recording and reproducing control device 100 determines that the reproduction of the video data to be reproduced should be ended (YES at step S205) and ends the process. When the above case does not apply, the recording and reproducing control device 100 determines that the reproduction of the video data to be reproduced should not be ended (NO at step S205) and executes the process at step S202 again.

As described above, in the present embodiment, when reproducing the video data of a period during which it is detected that the another vehicle gets close in a distance smaller than a predetermined distance to the own vehicle, the bird's-eye-view video 310 obtained by converting the point of view of the video data is reproduced and is displayed on the display 240. In the present embodiment, when road rage by the another vehicle is detected, it is possible to display the bird's-eye-view video 310 by which a relative positional relationship between the own vehicle and the another vehicle is checked easily. According to the present embodiment, with the bird's-eye-view video 310, it is possible to check closeness of the another vehicle to the own vehicle, a degree of road rage is determined easily and verifying dangerous driving can be easy. In this manner, according to the embodiment, when the another vehicle gets road rage, it is possible to check the positional relationship between the own vehicle and the another vehicle appropriately.

According to the present embodiment, the bird's-eye-view video 310 is displayed together with the reproduction video 300 that is video data to be reproduced. According to the present embodiment, it is possible to make a display such that the relative positional relationship between the own vehicle and the another vehicle is checked more easily.

According to the present embodiment, the bird's-eye-view video 310 in the direction in which it is detected that the another vehicle gets close in a distance smaller than the predetermined distance to the own vehicle is displayed. According to the present embodiment, it is possible to make a display such that the relative positional relationship between the own vehicle and the another vehicle is checked more easily.

According to the present embodiment, the bird's-eye-view video 310 contains the scale that makes it possible to determine a distance between the end of the own vehicle and the end of the another vehicle. According to the present embodiment, it is possible to check the distance between the own vehicle and the another vehicle easily.

According to the present embodiment, the virtual point of view EA of the bird's-eye-view video 310 is set on the upper side between the end of the own vehicle and the end of the another vehicle. According to the present embodiment, it is possible to make a display such that the relative positional relationship between the own vehicle and the another vehicle is checked more easily.

Second Embodiment

Figure 11:
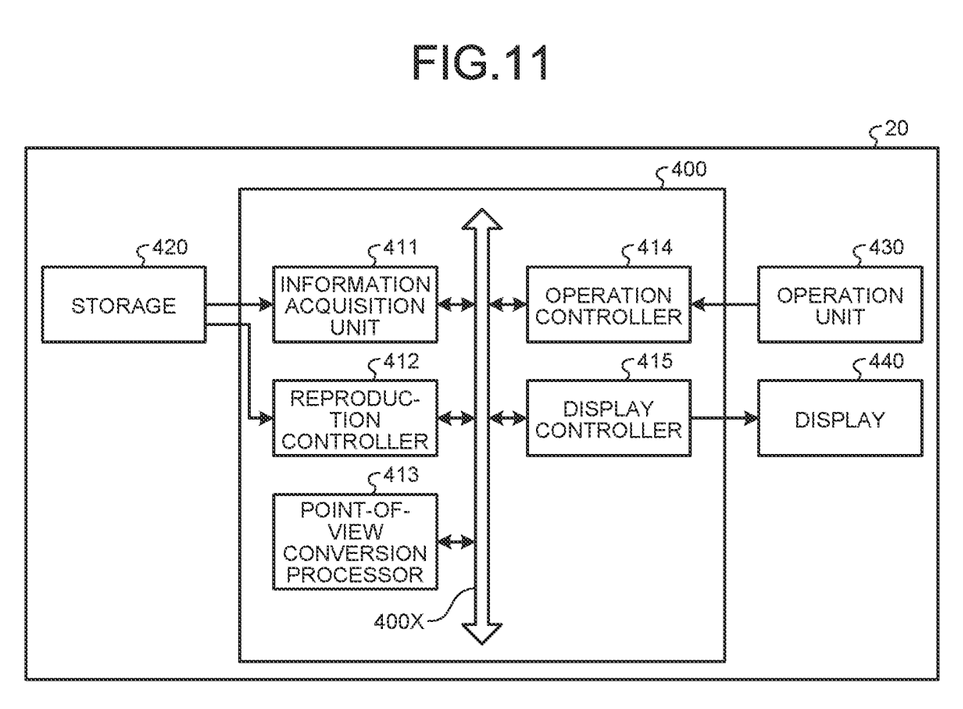
FIG. 11 is a block diagram illustrating an example of a configuration of a reproduction device including a reproduction control device according to a second embodiment.

With reference to FIG. 11, a reproduction device 20 according to the present embodiment will be described. FIG. 11 is a block diagram illustrating an example of a configuration of the reproduction device 20 including a reproduction control device 400 according to a second embodiment.

When event recording data or loop recording data to be reproduced includes a closeness flag, the reproduction device 20 reproduces and displays the bird's-eye-view video 310. The reproduction device 20 is, for example, an electronic device that includes a personal computer, a smartphone, and a tablet. The reproduction device 20 includes a storage 420, an operation unit 430, a display 440, and the reproduction control device 400.

In the storage 420, the event recording data, the loop recording data, etc., are recorded by the vehicle recording and reproducing device 10, or the like. The storage 420 is, for example, a semiconductor memory device, such as a flash memory, or a recording unit, such as a memory card. Alternatively, it may be an external recording unit that is wirelessly connected via a communication device not illustrated in the drawings.

The operation unit 430 is able to receive various operations on the reproduction device 20. For example, the operation unit 430 is able to receive an operation of reproducing the event recording data or the loop recording data that is recorded in the storage 420. For example, the operation unit 430 is able to receive an operation of deleting the event recording data that is recorded in the storage 420. The operation unit 430 outputs operation information to an operation controller 414 of the reproduction control device 400.

The operation unit 430 is a touch panel provided in the display 440 and, for an operation of reproducing the event recording data that is recorded in the storage 420, an operation of touching the display 440 is performed to make an instruction to choose and reproduce the event recording data.

The display 440 is, for example, a display that includes a liquid crystal display (LCD), an organic electro-luminescence (EL) display, or the like. The display 440 displays a video based on a video signal that is output from a display controller 415 of the reproduction control device 400. The display 440 displays a video that is recorded in the storage 420.

The reproduction control device 400 is, for example, an arithmetic processing device (control device) consisting of a CPU (Central Processing Unit), etc. The reproduction control device 400 loads a program that is recorded in a memory and executes commands contained in the program. The reproduction control device 400 includes an internal memory not illustrated in the drawings and the internal memory is used for a temporal storage of data in the reproduction control device 400, etc. The reproduction control device 400 includes an information acquisition unit 411, a reproduction controller 412, a point-of-view conversion processor 413, the operation controller 414 and the display controller 415.

The information acquisition unit 411 acquires data of a video that is imaged by a camera that images at least a front view or a rear view of the own vehicle and acquires information presenting a travel speed of the own vehicle and a distance between the own vehicle and the another vehicle.

The information acquisition unit 411 stores the acquired information in the storage 420.

The reproduction controller 412 acquires event recording data to be reproduced from the storage 420 and reproduces the event recording data. According to control signals on a choosing operation and a reproducing operation that are output from the operation controller 414, the reproduction controller 412 performs a control to reproduce the event recording data or the loop recording data recorded in the storage 420.

When reproducing video data of a period during which the travel speed of the vehicle equal to or higher than a predetermined speed and the distance between the own vehicle and the another vehicle is a distance smaller than the predetermined distance, the reproduction controller 412 reproduces a video obtained by converting the point of view of the video data by the point-of-view conversion processor 413. When there is road rage information that is associated with the event recording data that is chosen, the reproduction controller 412 outputs the bird's-eye-view video 310 to the display controller 415. The reproduction controller 412 may perform a control to reproduce the bird's-eye-view video 310 together with the event recording data or the loop recording data or perform a control to reproduce only the bird's-eye-view video 310.

The point-of-view conversion processor 413 performs a point-of-view conversion process in which a virtual point of view E is set on an upper side of the own vehicle on the video data that is acquired by the information acquisition unit 411.

The operation controller 414 acquires operation information on an operation that is received by the operation unit 430. For example, the operation controller 414 acquires choosing operation information indicating an operation of choosing the video data, reproducing operation information indicating an operation of the reproducing video data, or deleting operation information indicating an operation of deleting the video data and outputs a control signal.

The display controller 415 causes the display 440 to display the event recording data that is reproduced. The reproduction process in the reproduction control device 400 according to the second embodiment is the same as the reproduction process in the recording and reproducing control device 100 according to the first embodiment illustrated in FIG. 10.

The display controller 415 controls display of the event recording data or the loop recording data recorded in the storage 420 on the display 440. When the video data to be reproduced includes road rage information, the display controller 415 may cause the bird's-eye-view video 310 to be displayed together with the evet recording data or the loop recording data or may cause only the bird's-eye-view video 310 to be displayed.

In this manner, in the reproduction device 20 that reproduces the video data that is recorded in the vehicle recording and reproducing device 10, as in the first embodiment, the bird's-eye-view video 310 is displayed when the video data to be reproduced includes a closeness flag.

As described above, in the present embodiment, in the reproduction device 20 that reproduces the video data that is recorded in the vehicle recording and reproducing device 10, as in the first embodiment, the bird's-eye-view video 310 can be displayed when the video data to be reproduced includes a closeness flag. In this manner, according to the present embodiment, when the another vehicle gets road rage, it is possible to check the positional relationship between the own vehicle and the another vehicle appropriately.

The vehicle recording and reproducing device 10 and the reproduction device 20 according to the disclosure have been described and the disclosure may be carried out in various different modes in addition to the above-described embodiments.

Each component of the vehicle recording and reproducing device 10 and the reproduction device 20 illustrated in the drawings is functionally schematic and need not necessarily be physically configured as illustrated in the drawings. In other words, a specific mode of each device is not limited to those illustrated in the drawings, and all or part of the components may be functionally or physically distributed or integrated in a given unit according to the load of processing or usage of each device.

The configurations of the vehicle recording and reproducing device 10 and the reproduction device 20 are, for example, implemented by programs that are loaded in a memory as software. In the above-described embodiments, the configurations are described as functional blocks that are implemented by association of these sets of hardware or hardware. In other words, these functional blocks can be implemented in various forms using only hardware, software, or a combination of hardware and software.

The components described above include those easily assumed by those skilled in the art and those substantially the same. Furthermore, the above-described components can be combined as appropriate. Various omissions, replacements and changes of the components can be made within the scope of the application.

The case where the loop recording processing is performed has been described and this applies to a case where imaging is started after an event is detected.

The recording and reproducing control device, the reproduction control device, a display control method and a non-transitory storage medium that are disclosed are usable for, for example, drive recorders.

According to the present disclosure, an effect that it is possible to enable an appropriate checking of closeness of another vehicle to an own vehicle is achieved.

Although the application has been described with respect to specific embodiments for a complete and clear application, the appended claims are not to be thus limited but are to be construed as embodying all modifications and alternative constructions that may occur to one skilled in the art that fairly fall within the basic teaching herein set forth.

What is claimed is:

1. A recording and reproducing control device comprising:
a video data acquisition unit configured to acquire video data of a video imaged by an imager that captures at least one of a front view and a rear view of a vehicle;
a detector configured to detect that another vehicle gets close in a distance smaller than a predetermined distance to the vehicle in a state in which the vehicle is traveling at a predetermined speed or higher;
a point-of-view conversion processor configured to perform a point-of-view conversion process on the video data acquired by the video data acquisition unit to generate a bird's-eye-view video in which a virtual point of view is set on an upper side of the vehicle and the vehicle is viewed from the virtual point of view;
a recording controller configured to record the video data acquired by the video data acquisition unit;
a reproduction controller configured to;
when reproducing the video data of a period during which the detector does not detect that the another vehicle gets close in the distance smaller than the predetermined distance to the vehicle in the state in which the vehicle is traveling at the predetermined speed or higher in the video data recorded by the recording controller, reproduce the video data without converting the point of view of the video data by the point-of-view conversion processor; and
when reproducing the video data of a period during which the detector detects that the another vehicle gets close in the distance smaller than the predetermined distance to the vehicle in the state in which the vehicle is traveling at the predetermined speed or higher in the video data recorded by the recording controller, reproduce the video data obtained by converting the point of view of the video data by the point-of-view conversion processor; and
a display controller configured to cause a display to display the video data reproduced by the reproduction controller.

2. The recording and reproducing control device according to claim 1, wherein the reproduction controller is further configured to reproduce the video data obtained by converting the point of view and the video data before the conversion of the point of view by the point-of-view conversion processor.

3. The recording and reproducing control device according to claim 1, wherein the reproduction controller is further configured to convert the point of view of the video data of the video imaged in a direction in which it is detected that the another vehicle gets close in the distance smaller than the predetermined distance to the vehicle and reproduce the video data.

4. The recording and reproducing control device according to claim 1, wherein the reproduction controller is further configured to reproduce the video data obtained by converting the point of view with distance information by which a distance between an end of the vehicle and an end of the opposing another vehicle is able to be determined.

5. The recording and reproducing control device according to claim 1, wherein the point-of-view conversion processor is further configured to perform the point-of-view conversion process in which the virtual point of view is set on an upper side between an end of the vehicle and an end of the opposing another vehicle.

6. A reproducing control device comprising:
an information acquisition unit configured to acquire video data of a video obtained by capturing at least one of a front view and a rear view of a vehicle and information which includes a travel speed of the vehicle and a distance between the vehicle and another vehicle;
a point-of-view conversion processor configured to perform a point-of-view conversion process on the video data acquired by the information acquisition unit to generate a bird's-eye-view video in which a virtual point of view is set on an upper side of the vehicle and the vehicle is viewed from the virtual point of view; and
a reproduction controller configured to,
when reproducing the video data of a period during which the travel speed of the vehicle is equal to or higher than a predetermined speed and a distance between the vehicle and the another vehicle is not smaller than a predetermined distance, reproduce the video data without converting the point of view of the video data by the point-of-view conversion processor; and when reproducing the video data of a period during which the travel speed of the vehicle is equal to or higher than the predetermined speed and the distance between the vehicle and the another vehicle is smaller than the predetermined distance, reproduce the video data obtained by converting the point of view of the video data by the point-of-view conversion processor.

7. A display control method comprising:
a video data acquiring step of acquiring video data of a video imaged by an imager that captures at least one of a front view and a rear view of a vehicle;
a detecting step of detecting that another vehicle gets close in a distance smaller than a predetermined distance to the vehicle in a state in which the vehicle is traveling at a predetermined speed or higher;
a point-of-view conversion processing step of performing a point-of-view conversion process on the video data acquired at the video data acquiring step to generate a bird's-eye-view video in which a virtual point of view is set on an upper side of the vehicle and the vehicle is viewed from the virtual point of view;
a recording controlling step of recording the video data acquired at the video data acquiring step;
a reproduction controlling step of:
  when reproducing the video data of a period during which the detecting step does not detect that another vehicle gets close in the distance smaller than the predetermined distance to the vehicle in the state in which the vehicle is traveling at the predetermined speed or higher in the video data recorded at the recording controlling step, reproducing the video data without converting the point of view of the video data at the point-of-view conversion processing step; and
  when reproducing the video data of a period during which the detecting step detects that the another vehicle gets close in the distance smaller than the predetermined distance to the vehicle in the state in which the vehicle is traveling at the predetermined speed or higher in the video data recorded at the recording controlling step, reproducing the video data obtained by converting the point of view of the video data at the point-of-view conversion processing step; and
a display controlling step of causing a display to display the video data reproduced at the reproduction controlling step.

8. A non-transitory storage medium that stores a program that causes a computer that runs as a recording and reproducing control device to execute:
a video data acquiring step of acquiring video data of a video imaged by an imager that captures at least one of a front view and a rear view of a vehicle;
a detecting step of detecting that another vehicle gets close in a distance smaller than a predetermined distance to the vehicle in a state in which the vehicle is traveling at a predetermined speed or higher;
a point-of-view conversion processing step of performing a point-of-view conversion process on the video data acquired at the video data acquiring step to generate a bird's-eye-view video in which a virtual point of view is set on an upper side of the vehicle and the vehicle is viewed from the virtual point of view;
a recording controlling step of recording the video data acquired at the video data acquiring step;
a reproduction controlling step of:
  when reproducing the video data of a period during which the detecting step does not detect that another vehicle gets close in the distance smaller than the predetermined distance to the vehicle in the state in which the vehicle is traveling at the predetermined speed or higher in the video data recorded at the recording controlling step, reproducing the video data without converting the point of view of the video data at the point-of-view conversion processing step; and
  when reproducing the video data of a period during which the detecting step detects that the another vehicle gets close in the distance smaller than the predetermined distance to the vehicle in the state in which the vehicle is traveling at the predetermined speed or higher in the video data recorded at the recording controlling step, reproducing the video data obtained by converting the point of view of the video data at the point-of-view conversion processing step; and
a display controlling step of causing a display to display the video data reproduced at the reproduction controlling step.

* * * * *